United States Patent [19]

Yamasawa et al.

[11] Patent Number: 4,547,782
[45] Date of Patent: Oct. 15, 1985

[54] MAGNETIC PRINTER

[75] Inventors: Akira Yamasawa; Teruhiko Itami; Toshifumi Kimoto, all of Ebina, Japan

[73] Assignee: Fuji Xerox Co., Ltd., Japan

[21] Appl. No.: 644,271

[22] Filed: Aug. 27, 1984

[30] Foreign Application Priority Data

Oct. 6, 1983 [JP] Japan .............................. 58-186012

[51] Int. Cl.$^4$ ............................................ G01D 15/12
[52] U.S. Cl. .................................. 346/74.4; 346/74.2; 118/652
[58] Field of Search ............................ 346/74.2, 74.4; 118/652; 360/59; 358/301

[56] References Cited

U.S. PATENT DOCUMENTS 3,965,478  6/1976  Schloemann ................. 346/74.2 X Primary Examiner—Thomas H. Tarcza
Attorney, Agent, or Firm—Kinney & Lange

[57] ABSTRACT

This invention provides a magnetic printer which permits substantially thorough removal of the residual developing agent from the magnetic latent image carrier or the photoreceptor's surface after the stage of image transfer even when the developing agent in use has high specific resistance and excels in both transfer property and developing property.

The magnetic printer according to this invention is adapted to effect removal of any developing agent remaining on the magnetic latent image carrier after transfer of a visible image of developing agent by conferring electric charge upon the residual developing agent and subsequently forcing thorough departure of the residual developing agent from the magnetic latent image carrier by virtue of electrostatic force, wherein a source of electric pulses is used to generate the aforementioned electro-static force in such a manner that the electric charges imparted in advance to the residual developing agent are prevented from being reduced, totally eliminated or even reversed the polarity thereof by the DC electric field produced by the DC electric field produced between a bias roll and an opposite roll.

3 Claims, 6 Drawing Figures

MAGNETIC PRINTER

BACKGROUND OF THE INVENTION

1. Field of the Invention

This invention relates to a magnetic printer, and more particular to a magnetic printer which is provided with cleaning means capable of effectively removing any developing agent remaining on a magnetic latent image carrier.

2. Description of Prior Art

The magnetic printer is a device for obtaining a hard copy by forming a magnetic latent image on a magnetic latent image carrier, converting the magnetic latent image into a visible image with a magnetic developing agent, and transferring the image of the developing agent onto plain paper, for example. As a printer befitting the current needs, the magnetic printer has come to attract keen attention.

In this device, the magnetic latent image carrier by nature is repeatedly used and it suffers adhesion of residual developing agent on its surface even after transfer of the image. Thus, the magnetic printer is required to have the residual developing agent removed from the magnetic latent image carrier at a suitable time after the transfer of the image in the last round and before the formation of a new magnetic latent image in the next round.

For this purpose, the magnetic printer is generally provided somewhere between the transfer section and the latent image forming section with a cleaning device.

Techniques available for obtaining a hard copy by forming on a latent image carrier a latent image corresponding to the image on a given original manuscript, converting the latent image into a visible image with a developing agent, and transferring the image of the developing agent onto a sheet of plain paper are represented by xerography.

For the cleaning of the latent image carrier in the xerography, the following devices have been developed and put to use.

(1) Vacuum fur brush cleaner
(2) Vacuumless fur brush cleaner
(3) Doctor blade cleaner
(4) Wiper blade cleaner
(5) Web cleaner In the various cleaning devices enumerated above, the vacuum fur brush cleaner excels the other devices in terms of cleanability (ability to remove the residual developing agent), service life, and reliability of performance and has found actual adoption.

In the xerography, it is not unusual that the developing agent persists on the latent image carrier in density of the order of 0.015 as measured by visual observation even after the latent image carrier has been cleaned with the vacuum fur brush cleaner.

In the xerography, the developing agent suffered to remain in this density on the latent image carrier offers absolutely no obstacle to the formation of a latent image in the subsequent round of the printing operation.

The reason is that since the xerography effects the formation of a latent image with the input of light in a pattern identical with the image, the exposure of the photosensitive surface or the phtoreceptor's surface to this input of light is attained as desired even when particles of the developing agent some tens of microns ($\mu$m) in diameter remain scattered in the density of about 0.015 on the latent image carrier or the photoreceptor's surface.

FIG. 1 is a schematic structural diagram of an ordinary magnetic printer known to the art.

A magnetic latent image carrier or a photoreceptor's surface 1 is uniformly magnetized in one direction with a combination preorientation and erase magnet 7. The magnetic latent image carrier 1, for example, is an endless tape having $CrO_2$ powder applied in a thickness of about 5 to 10 $\mu$m as a magnetic layer on a substrate of Mylar 75 $\mu$m in thickness.

The aforementioned magnetic latent image carrier 1 is heated in picture element units correspondingly to a picture image signal by a thermal print head 10 with which the magnetic latent image carrier 1 comes into sliding contact. At the same time, to the heated part of the carrier 1, a bias magnetic field is applied in a direction opposite the direction of the aforementioned unidirectional magnetization by a bias magnet 11.

Consequently, on the magnetic latent image carrier 1, a magnetic latent image corresponding to the picture image signal is formed by the phenomenon of thermoremanent remagnetization. By a developer 2, the magnetic latent image thus formed is converted into a visible image with a magnetic developing agent (such as, for example, a nonconductive single component magnetic toner; specific resistance $10^{10}$ $\Omega$cm).

The toner image, i.e. the visible image formed of the developing agent, is negatively charged by a pretransfer corotron (corona discharge tube) 3, for example. As the aforementioned magnetic latent image carrier 1 moves on and arrives under a transfer roll 4, a sheet of plain paper 6 fed out of a paper tray 5 joins the magnetic latent image carrier 1 and, from this point onward, the aforementioned magnetic latent image carrier 1 and the plain paper 6 travel at an equal speed.

Since a voltage enough to attract the electric charge of the developing agent is applied bias to the transfer roll 4, the toner image on the magnetic latent image carrier 1 is transferred by the transfer roll 4 onto the plain paper 6. The plain paper 6 onto which the visible image of the developing agent has been transferred is then sent through a fixing device (not shown) and finished as a hard copy.

In the meantime, the magnetic latent image carrier which has undergone the stage of image transfer is erased by the combination preorientation and erase magnet 7 and uniformly magnetized. The developing agent still remaining on the magnetic latent image carrier 1 after the stage of image transfer is deprived of electricity and then removed by a suitable cleaning device 9.

By repeating the process described above, various hard copies are obtained.

The inventors prepared a magnetic printer having the construction of FIG. 1 and incorporating a vacuum fur brush cleaner therein as the cleaning device 9 and trially operated this magnetic printer to evaluate the vacuum fur brush cleaner for its performance as a cleaning device.

In the experiment, (1) A layer of $CrO_2$ 5 $\mu$m in thickness was used as the magnetic layer of the magnetic latent image carrier 1. The coercive force, Hc, of this magnetic layer was about 500 oersteds and the curie point, Tc, thereof was 126° C.

(2) The combination preorientation and erase magnet 7 used in the magnetic printer was of a grade capable of generating a magnetic field of about 700 oersteds in the magnetic layer ($CrO_2$) portion of the magnetic latent image carrier 1.

(3) The thermal print head 10 was of a type such that the heat generating element thereof heats itself to a temperature of 350° C. and elevates the temperature of the magnetic layer of the magnetic latent image carrier 1 to the neighborhood of 200° C. (higher than the curie point).

(4) A magnet of the grade capable of generating a magnetic field of the order of 50 oersteds in the magnetic layer of the magnetic latent image carrier 1 was used as the bias magnetic field generating magnet 11.

In the magnetic printer of the construction described above, the density of the developing agent which remained after the cleaning with the vacuum fur brush cleaner, as measured by the same visual observation as in the aforementioned xerography, was about 0.002.

This is a more desirable value than the value of density generally found in the xerography. In the magnetic printer, however, the thermal print head 10 as a means for forming a latent image corresponding a given picture image is pressed against and held in sliding contact with the magnetic latent image carrier 1. Consequently, the residual developing agent will eventually adhere and build up on the heat generating element portion of the thermal print head.

Under the influence of the developing agent thus accumulated, the heat radiated by the heat generating element of the thermal print head 10 will cease to reach the magnetic latent image carrier 1 sufficiently. As the result, the phenomenon of thermoremanent magnetization to manifest on the magnetic latent image carrier 1 will eventually cease to occur as designed and the formation of magnetic latent image will be consequently prevented.

It was ascertained that when the copying process of latent image formation—development—image transfer—demagnetization—cleaning was repeated with a magnetic printer of the construction of FIG. 1, the heat generating element of the thermal print head 10 was smeared so much with the developing agent after about 100 cycles of the process as to affect adversely the formation of magnetic latent image.

The cleaning device used in the conventional magnetic printer is intended to remove the residual developing agent from the latent image carrier by a mechanical wiping action. Thus, it suffers from the following drawbacks.

(1) The ability of the cleaning brush, for example, to remove the residual developing agent (cleanability) is not sufficient when the condition of contact of the cleaning brush with the latent image carrier is not good. Thus, the condition of contact calls for delicate adjustment and the maintenance and adjustment are difficult.

(2) The service life of the cleaning brush, for example, which is kept in direct contact with the latent image carrier (which service life is short owing to the mechanical contact) directly bears on the service life of the cleaning means as a whole. Thus, the cleaning brush is destitute of reliability in protracted performance.

With a view to eliminating the aforementioned drawbacks, the inventors have already proposed a cleaning device adapted to effect the removal of the residual developing agent from the magnetic latent image carrier by conferring electric charge upon the developing agent remaining on the magnetic latent image carrier and subsequently forcing the departure of the electrically charged developing agent from the latent image carrier by the use of electrostatic force.

FIG. 2 represents a schematic side view illustrating the essential part of the cleaning device proposed by the inventors as described above. In the diagram, the same symbols as used in FIG. 1 denote identical or equal parts.

To a developing agent 12 which remains on the magnetic latent image carrier 1 after the process of image transfer, the preclean corotron 8A disposed as juxtaposed to the travel path of the magnetic latent image carrier 1 imparts desired polarity and magnitude of electric charge.

To a bias roll 13 disposed on the downstream side of the aforementioned preclean corotron 8A, a bias voltage is applied by a DC high-voltage power source 14. An opposite roll 15 opposed to the aforementioned bias roll 13 across the aforementioned magnetic latent image carrier 1 is grounded.

Consequently, a static electric field of desired polarity and magnitude can be generated between the aforementioned bias roll 13 and the opposite roll 15.

While the residual developing agent 12 on the magnetic latent image carrier 1 to which an amount of electric charge of either polarity (minus polarity, for example) has been given by the preclean corotron 8A is passing the gap between the bias roll 13 and the opposite roll 15, the DC static electric field (such as to render the bias roll 13 side plus) generated between the bias roll 13 and the opposite roll 15 exerts electrostaic force to bear upon the electric charge possessed by the residual developing agent 12, causing the residual developing agent 12 to depart from the magnetic latent image carrier 1 and adhere to the bias roll 13.

In this manner is the magnetic latent image carrier 1 cleaned.

The developing agent thus adhering to the bias roll 13 is removed from the bias roll 13 and recovered by developing agent removing means 16 (such as, for example, a doctor blade or blade-shaped magnet) which is lightly pressed against and kept in contact with the bias roll 13.

By this treatment, no developing agent is allowed to remain on the surface of the bias roll 13. The bias roll 13, therefore, can be retained in an unsmeared state for a long time.

When a blade-shaped magnet is adopted as means 16 for the removal of the adhering developing agent from the aforementioned bias roll 13, suitable selection of the magnitude and polarity of magnetization and the oposition for disposition of the magnet allows a choice between the following two cases:

(1) The magnetic field generated by the blade-shaped magnet will not be enabled to affect in the least the condition of magnetization of the magnetic layer of the magnetic latent image carrier 1.

(2) The magnetic field will be enabled to manifest a large effect enough to fulfil both elimination of the magnetic latent image and unidirectional magnetization of the magnetic latent image carrier.

Apparently in the latter case, the combination preorientation and erase magnet 7 may be omitted wholly or simplified.

FIG. 3 represents a schematic side view illustrating the essential part of another embodiment of the cleaning device formerly proposed by the inventors. In this diagram, the same symbols as used in FIG. 2 denote identical or equal parts.

SUMMARY OF THE INVENTION

This invention has been made for the purpose of eliminating the aforementioned disadvantage. An object of this invention is to provide a magnetic printer which permits substantially thorough removal of the residual developing agent from the magnetic latent image carrier after the stage of image transfer even when the developing agent in use has high specific resistance and excels in both transfer property and developing property.

To accomplish the object described above, this invention provides a magnetic printer adapted to effect removal of any developing agent remaining on the magnetic latent image carrier after transfer of a visible image of developing agent by conferring electric charge upon the residual developing agent and subsequently forcing thorough departure of the residual developing agent from the magnetic latent image carrier by virtue of electrostatic force, which magnetic printer is characterized by using a source of electric pulses for the generation of the aforementioned electric charge thereby preventing the electric charge of the residual developing agent from inducing the said abnormal phenomenon.

DETAILED DESCRIPTION OF THE PREFERRED EMBODIMENT

Now, the present invention will be described in detail below with reference to the accompanying drawings.

Figure 4:
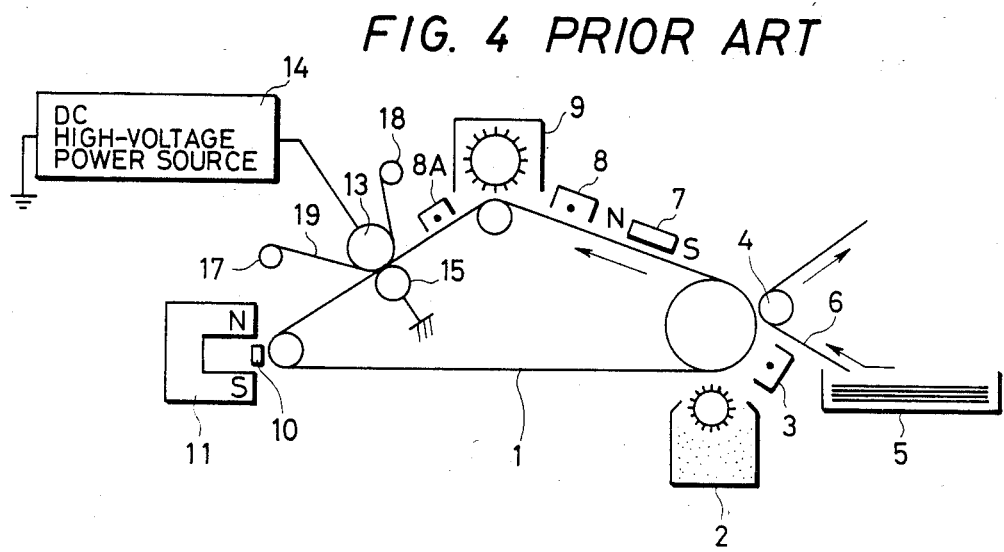
FIG. 4 is a side view of the essential part of a magnetic printer incorporating the aforementioned DC charge type cleaning device.
Figure 5:
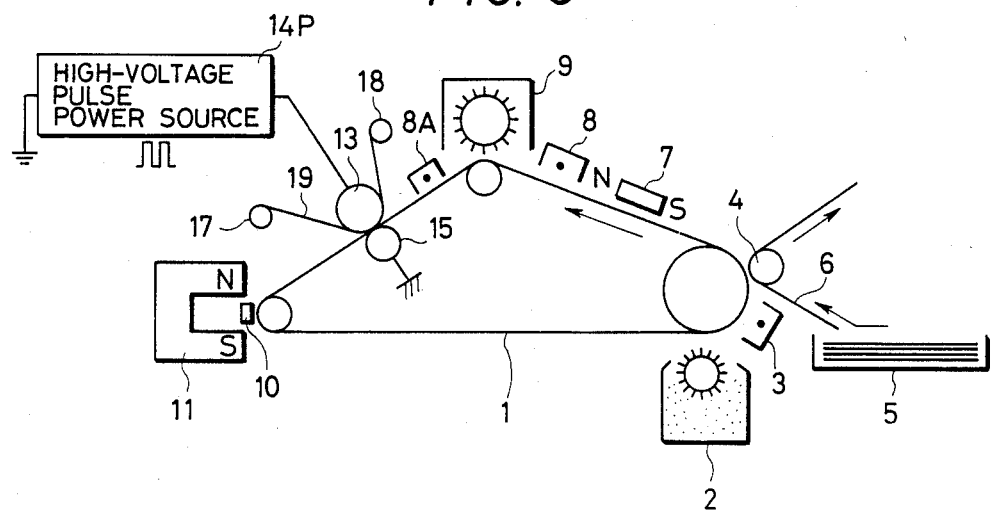
FIG. 5 is a side view schematically illustrating the construction of one preferred embodiment of this invention.

FIG. 5 is a side view schematically illustrating one preferred embodiment of this invention. In the diagram, the same symbols as used in FIG. 4 denote identical or equal parts.

This embodiment equals the conventional magnetic printer illustrated in FIG. 4, except for a modification which resides in using, as a high-pressure power source 14P, one which is capable of periodically feeding out high voltage in the form of pulses.

The magnetic printer of this construction was operated, with the electric charge given by the preclean corotron 8 to the residual developing agent 12 fixed at about 15 μc/g of specific toner charge and the voltage applied by the high-pressure power source 14P to the bias roll 13 fixed at 15 K-volts of peak value, 100 Hz of frequency, and 100 μ.sec of pulse width, to evaluate the cleaning device for cleanability.

In the experiment, three types of toner having $10^{10}$, $10^{12}$, and $10^{15}$ Ωcm of specific resistance were used.

Figure 6:
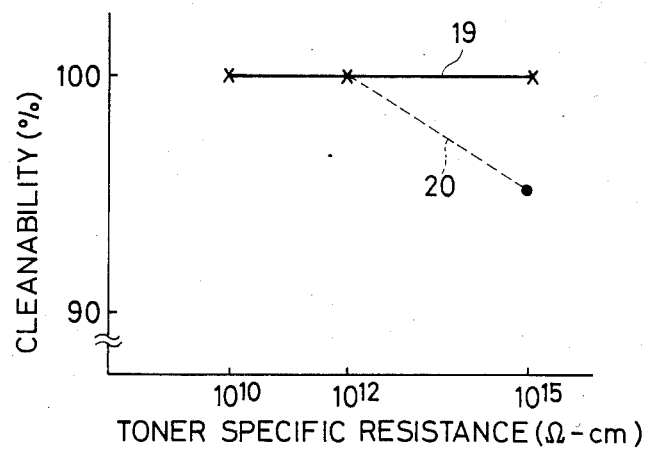
FIG. 6 is a graph showing the results of experiment for the illustration of the effect of this invention.

The results are shown by a solid line 19 in FIG. 6.

From the diagram, it is noted that when high voltage was applied in the form of pulses to the bias roll 13 in accordance with this invention, the cleanability showed no sign of decline and could be maintained substantially at 100% despite an increase in the specific toner resistance.

In the case of the magnetic printer of the DC charging type, the cleanability was degraded when the specific toner resistance rose above $10^{12}$ Ωcm as indicated by the dotted line 20 of the samediagram. The comparison clearly indicates that the pulse charging method excels the DC charging method in terms of cleanability relative to the high-resistance toner.

When the copy process was repeated with the magnetic printer of the construction of FIG. 5 using a toner of the grade having specific resistance of $10^{15}$ Ωcm, it was confirmed that copies of desirable quality were obtained even after 100,000 repetitions of the process without suffering the heat generating element of the thermal print head 10 to be smeared with the developing agent or exposing the formation of magnetic latent image to any hindrance.

Incidentally, the pulse charging method operated as described above is also effective where the electric charge is given by the preclean corotron 8 to the residual toner.

For example, in this method, when a high-resistance toner is used as the developing agent, the corona current can be amply decreased so that the said abnormal phenomenon is not induced during the exposure of the developing agent to the corona generated by the preclean corotron 8. Moreover, this method enables the developing agent to be uniformly and stably exposed to the corona. The residual toner, therefore, can be given desired polarity and quantity of electric charge uniformly.

The magnetic printer of the construction of FIG. 5 was operated, with the pulse charging method adopted for both the bias roll 13 and the preclean corotron 8, to make evaluation of cleanability. The cleanability obtained in this experiment was equivalent to or even better than the cleanability shown by the solid line 19 in FIG. 6.

This invention can be embodied in modifications such as shown below.

(1) The opposite roll is not exclusively required to be in the form of a roll. It may be a mere flat plate or a pressure plate disposed as opposed to the bias roll.

(2) The cleaning device may be disposed at any desired position in sofar as it falls between the transfer means and the thermal print head.

(3) The pulse voltage may be rendered adjustable with respect to peak value, frequency, and level of duty, so that the magnitude of electric charge conferred upon the residual developing agent will be adjustable.

As is plain from the foregoing description, this invention brings about the following effects.

(1) Since the cleaning means operates with electrostatic force and the cleaning power (electrostatic force) acts upon all the particles of the residual developing agent, the cleanability is notably improved and substantially thorough (100%) cleaning can be obtained.

(2) Since no mechanical contact is relied on for cleaning, the contact pressure between the cleaning means and the magnetic latent image carrier and the nip width between the bias roll and the opposite roll are adjustable with generous tolerance. The maintenance and the adjustment of these parts, therefore, are simple.

(3) The cleaning means enjoys an elongated service life and the magnetic printer as a whole offers improved reliability of performance over an increased duration.

Figure 2:
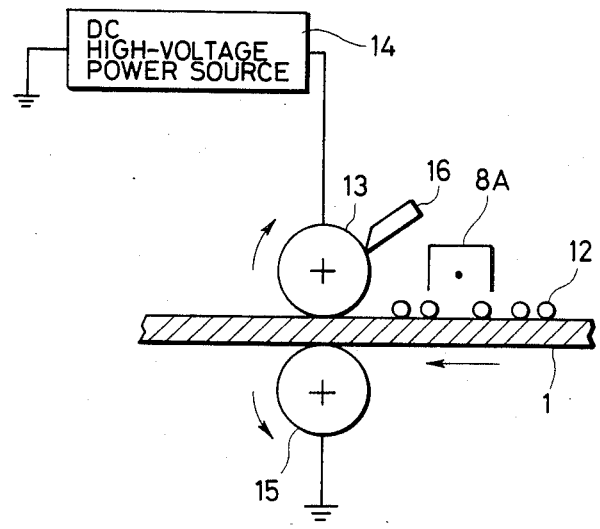
FIG. 2 and FIG. 3 are side views of the essential parts of DC charge type cleaning devices formerly proposed by the inventors.
Figure 3:
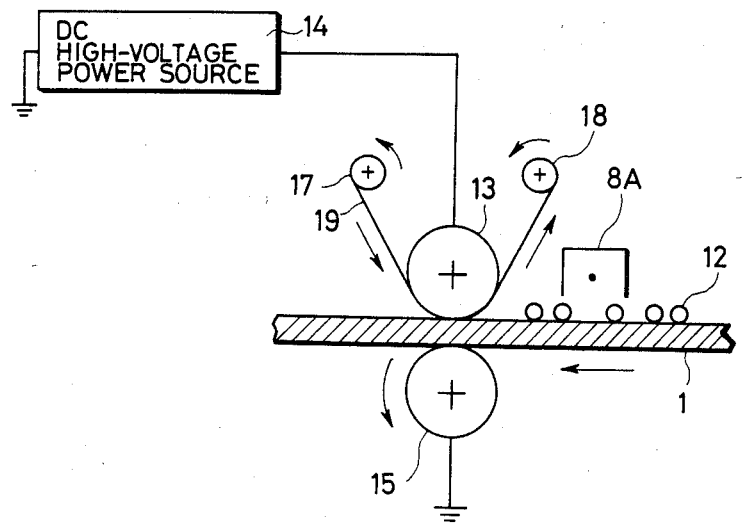

Comparison of FIG. 3 with FIG. 2 clearly reveals that the cleaning device of the present construction equals the cleaning device of the construction of FIG. 2 plus a web 19 movably interposed between the bias roll 13 and the magnetic latent image carrier 1. By the addition of this web 19, the residual developing agent can be removed without entailing the otherwise inevitable adhesion of the removed residual developing agent to the bias roll 13. Consequently, the overall maintenance of the cleaning device can be simplified.

As is plain from the diagram, during the operation of the magnetic printer, the web is payed out of a feed roll 17 and rewound on a takeup roll 18.

In this arrangement, when the developing agent remaining on the magnetic latent image carrier 1 is attracted toward the bias roll 13 by the static electric field generated between the bias roll 13 and the opposite roll 15, the residual developing agent departing from the latent image carrier is made to adhere to the web 19 and not to the bias roll 13. The developing agent now deposited on the web 19 is recovered as the web is rewound on the takeup roll 18.

The cleaning device of the construction of FIG. 3, therefore, ensures perfect protection of the bias roll 13 from the adhesion of the removed developing agent, enables the web 19 to produce its fresh surface at all times between the bias roll 13 and the magnetic latent image carrier 1, retains its effect intact in the removal of the residual developing agent, and materializes removal of the residual developing agent faithful to the design.

In the construction under discussion, the web 19 also possesses the cleaning ability manifested by the wiping type web cleaner in the ordinary xerography. In this construction, therefore, the dual cleaning function of the web 19 adds more to the perfection of the removal of the residual developing agent.

Figure 1:
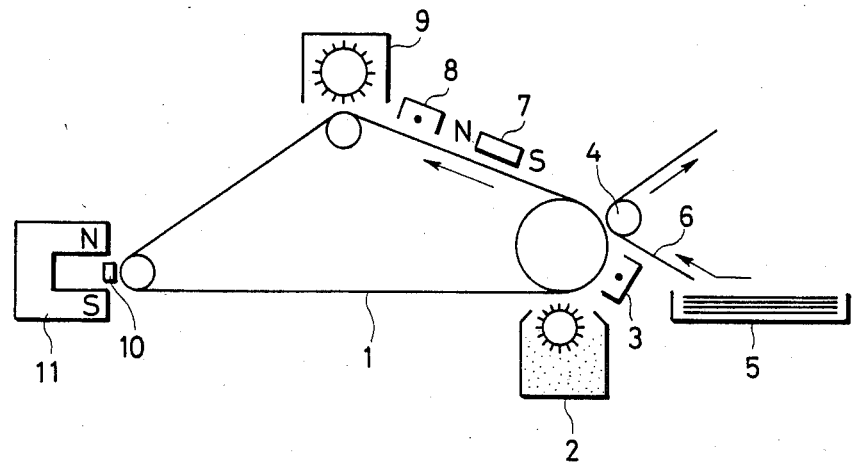
FIG. 1 is a side view schematically illustrating the construction of a conventional magnetic printer.

The inventors prepared a magnetic printer having the conventional construction of FIG. 1 and incorporating therein the means for removal of the residual developing agent illustrated in FIG. 3 and trially operated this magnetic printer to evaluate the aforementioned means for its cleaning ability.

FIG. 4 represents a schematic structural diagram of the magnetic printer used by the inventors in the aforementioned experiment of evaluation. In the diagram, the same symbols as used in FIG. 3 denote identical or equal parts.

In this case, a vacuum fur brush was used as the cleaning means 9 and the cleaning device of FIG. 3 was disposed on the immediately downstream side thereof. In other words, the vacuum fur brush was used as a main cleaner and the cleaning device of FIG. 3 as a sub-cleaner. The parts of the printer had the following specifications.

A metallic roll (60 mm in diameter, ground potential) was used as the opposite roll 15, a high-resistance rubber roll (30 mm in diameter, resistance about 100 K$\Omega$, and hardness about 50°) as the bias roll 13, and these two rolls were separated to give a nipping width of about 4 mm.

The magnetic latent image carrier 1 was prepared by applying a magnetic layer of $CrO_2$ in a thickness of 5 to 10 $\mu$m to a substrate of Mylar 75 $\mu$m in thickness. The same web as used in the electronic duplicating machine, Model 2200, made by Fuji-Xerox was adopted as the web 19.

As the preclean corotron 8a, a developing agent, No. 1 (nonconductive single component magnetic toner, specific resistance $10^{10}$ $\Omega$cm), of a grade capable of giving about plus 15 $\mu$c/g of specific toner charge. To the metallic shaft (10 mm in diameter) serving as the shaft of the bias roller 13, minus 1 K volt was applied.

Highly desirable copies were obtained on sheets of plain paper 6 by repeating the aforementioned copy process of formation of latent image—development—transfer—demagnetization—cleaning. In this case, there was observed no sign of the conventionally not unusual evil situation that the heat generating element of the thermal print head 10 is smeared with the developing agent and the formation of magnetic latent image is impeded.

The results of the experiment indicate that satisfactory copies were obtainable even after 100,000 repetitions of this copy process.

It was further ascertained that this copy process proceeded advantageously even when the magnetic printer used in the aforementioned experiment of evaluation was operated by using the means for removal of the residual developing agent illustrated in FIG. 3 as the cleaner instead of the preclean corotron 8 and the vacuum fur brush cleaner 9.

Also in this case, it was ascertained that copies of high quality could be obtained even after 100,000 cycles of copy process.

When the same copy process was tried by using a developing agent No. 2 (nonconductive single component magnetic toner, specific resistance $10^{15}$ $\Omega$cm), which excels the developing agent No. 1, formerly used in the experiment, in both developing property and transfer property, however, the copy process did not proceed as satisfactorily as expected.

In this case, there was detected the drawback that owing to the insufficient cleaning ability of the cleaning device, the heat generating element of the thermal print head 10 was smeared with the developing agent and the formation of magnetic latent image was impeded.

The copy process, therefore, was obtained satisfactorily only in the first about 1000 rounds.

The inventors' examination of the results of experiment indicates that the early decline of the cleaning ability in the experiment mentioned above was caused by the fact that since the specific resistance of the developing agent was on an unusually high order of $10^{15}$ $\Omega$cm, when the residual developing agent 12 was passing under the bias roll 13, the electric charge imparted in advance to the residual developing agent 12 was reduced, totally eliminated or even reversed the polarity thereof by the DC electric field produced between the bias roll 13 and the opposite roll 15. Preclusion of the said abnormal phenomenon requires the corona current between the high-resistance bias roll and the magnetic latent image carrier to be repressed to an amply lower value.

With the conventional DC charging method, however, any attempt to lower the voltage applied and decrease the corona current below a certain level merely entails a disadvantage that the corona discharge itself is liable to lose stability and, because of lack of surface regularity in the magnetic latent image carrier and the high-resistance bias roll itself and further because of adhesion of the developing agent to such irregular surfaces, the distribution of the corona current between the magnetic latent image carrier and the high-resistance bias roll is seriously deprived of uniformity (or freedom from dispersion), and the cleaning ability is rather degraded than improved.

(4) Since the quantity of electric charge given to the residual developing agent can be optimized by suitable control, high cleanability can be retained even when the relative resistance of the developing agent is high.

What is claimed is:

1. A magnetic printer, comprising a magnetic latent image carrier travelling in one direction along a predetermined path, magnet means disposed on said predetermined path and adapted to magnetize said magnetic latent image carrier uniformly in a predetermihed direction, a thermal print head device for heating said magnetic latent image carrier in image element units corresponding to given picture image signals thereby forming a magnetic latent image on said magnetic latent image carrier owing to thermoremanent magnetization, a developer for causing a developing agent to act on said magnetic latent image thereby converting said magnetic latent image into a visible image, means for transferring the visible image of said developing agent formed on said magnetic latent image carrier onto a sheet of plain paper, and cleaning means disposed between said thermal print head device and said means for transferring and adapted to remove any residual developing agent from said magnetic latent image carrier, charging said cleaning means comprising means for conferring electric charge of predetermined polarity upon said residual developing agent, a bias roll disposed as juxtaposed to said magnetic latent image carrier on a downstream side of said charging means, and a high-voltage pulse source for applying pulse voltage to said bias roll and allowing electrostatic force to act upon said residual developing agent on said magnetic latent image carrier while said magnetic latent image carrier is in the process of passing thereunder and thereby causing said residual developing agent to be attracted by said bias roll.

2. A magnetic printer according to claim 1, which further comprises means for removing the residual developing agent adhering to said bias roll.

3. A magnetic printer, comprising a magnetic latent image carrier travelling in one direction along a predetermined path, magnet means disposed on said predetermined path and adapted to magnetize said magnetic latent image carrier uniformly in a predetermined direction, a thermal print head device for heating said magnetic latent image carrier in image element units corresponding to given picture image signals thereby forming a magnetic latent image on said magnetic latent image carrier owing to thermoremanent magnetization, a developer for causing a developing agent to act on said magnetic latent image thereby converting said magnetic latent image into a visible image, means for transferring the visible image of said developing agent formed on said magnetic latent image carrier onto a sheet of plain paper, and cleaning means disposed between said thermal print head device and said means for transferring and adapted to remove any residual developing agent from said magnetic latent image carrier, said cleaning means comprising charging means for conferring electric charge of predetermined polarity upon said residual developing agent, a bias roll disposed as juxtaposed to said magnetic latent image carrier on the downstream side of said charging means, a web movably interposed between said bias roll and the magnetic latent image carrier, and a high-voltage pulse source for applying pulse voltage to said bias roll and allowing electrostatic force to act upon said residual developing agent on said magnetic latent image carrier while said magnetic latent image carrier is in the process of passing thereunder and thereby causing said residual developing agent to be attracted by said bias roll.

* * * * *